Patented Nov. 27, 1923.

1,475,545

UNITED STATES PATENT OFFICE.

LOUIS CHARLES DREFAHL, OF LAKEWOOD, AND CHARLES H. SAKRYD, OF CLEVELAND, OHIO, ASSIGNORS TO THE GRASSELLI CHEMICAL COMPANY, OF CLEVELAND, OHIO, A CORPORATION OF OHIO.

ARSENATE OF LIME PRODUCT AND PROCESS OF MAKING SAME.

No Drawing.    Application filed January 30, 1922. Serial No. 532,833.

*To all whom it may concern:*

Be it known that we, (1) LOUIS C. DREFAHL and (2) CHARLES H. SAKRYD, citizens of the United States, residing at (1) Lakewood, (2) Cleveland, in the county of Cuyahoga and State of Ohio, have invented certain new and useful Improvements in Arsenate of Lime Products and Processes of Making Same, of which the following is a specification.

This invention relates to the production of calcium arsenate or a product containing calcium arsenate suitable for use as an insecticide.

The ordinary method for the commercial production of calcium arsenate (arsenate of lime) consists in causing a solution of commercial arsenic acid to react with calcium hydroxid in the form of a milk of lime slurry of suitable strength, the reaction being carried out at the ordinary prevailing room temperature. The resulting precipitate is separated from the vehicle in which it has been precipitated in any suitable manner, such as, by filter pressing, whereby arsenate of lime paste is formed which may be sold as such, but more commonly the paste is further dried and pulverized to produce a dry powdered arsenate of lime product.

It has been found that the presence of free lime in the product reduces its water soluble arsenic acid content and improves its stability and it has therefore become customary in the manufacture of arsenate of lime for insecticidal use to employ a considerable excess of lime slurry in the reaction so that the product will contain free lime. The free lime so provided in the product varies in amount up to as high as 5 per cent or more. By operating in this manner it has been possible to produce products meeting in general the requirements of the national and State insecticide and fungicide boards with regard to physical properties, total arsenic acid content and water soluble arsenic acid content.

In the preparation of arsenate of lime as described above the water soluble arsenic acid content of the product may be decreased and the stability of the product improved by increasing the amount of excess of lime employed but this in turn results in a decrease in the total arsenic acid content of the product which normally is only slightly above the minimum limit. On the other hand if it is attempted to increase the total arsenic acid content of the product by decreasing the amount of excess of lime employed then the stability of the product is lessened and the water soluble arsenic acid content is increased. The process has been found to be rather difficult to control so as to give a uniform product and frequently results in a product which exceeds the permissible limits with regard to total arsenic acid content and water soluble arsenic acid content.

Our experience with the foregoing process and product has led us to believe that the calcium arsenate in the product is very loosely bound, probably consisting of a mixture of mono, di, tri, and even calcium tetra arsenate.

In studying the process with a view to the production of a more stable commercial arsenate of lime, a large amount of research has been directed to a determination of the effect of the temperature employed during precipitation or neutralization.

We have found that at an elevated temperature (120° F. or higher) it is possible to make a product which is very much more stable than the commercial product heretofore produced and which also has a larger total arsenic acid content. Upon the basis of this discovery we have devised a process for the manufacture of commercial arsenate of lime having improved properties with respect to total arsenic acid content, water soluble arsenic acid content, and stability, the physical properties of which are as satisfactory as the corresponding physical properties of commercial calcium arsenate produced by cold precipitation.

An example of our process is as follows:

A solution of arsenic acid testing about 20 per cent $As_2O_5$ is slowly added with stirring to a lime slurry testing about 10 per cent CaO while maintaining the reaction mixture at a temperature of from 140° F. to 160° F. The ratio of solids to liquids in the completed batch is about one to twelve. The addition of arsenic acid solution preferably is continued until the mixture is only faintly alkaline thus leaving a slight excess of free lime in the mixture. The precipitate is separated, dried and powdered in the usual manner.

This process is capable of considerable variation and it is to be understood that the invention is not limited to the details set forth in the example given above. The arsenic acid solution and the lime slurry employed may vary in concentration but a concentrated solution and slurry are of course preferred since they reduce the bulk of liquid to be handled. On the other hand the reagents must not be so concentrated as to prevent complete reaction or detrimentally affect the physical properties of the product.

It has been stated that a slight excess of lime is employed since it is thought that the stability of the product under storage is thus improved. The excess of lime however is not essential since the product is quite stable without it.

The temperature at which the reaction is carried out may vary from 120° F. to 200° F. or even 212° F. Satisfactory results have been obtained at temperatures as low as 120° F. and as high as 212° F. At temperatures outside of the range from 140° F. to 160° F. there is a tendency for the physical properties of the product to be less satisfactory than when precipitation is carried out at from 140° F. to 160° F.

The product as prepared by our process, when reasonably pure reagents have been employed, besides meeting the Government specifications with regard to physical properties contains considerably more than 40 per cent of arsenic acid calculated as $As_2O_5$ and considerably less water soluble arsenic acid than is required by the Government specifications and, as compared with commercial arsenate of lime heretofore produced, is considerably more stable under storage conditions.

The stability of the product and the effect of the employment of different elevated temperatures during precipitation upon the stability are illustrated in the following table.

Product containing about 45 per cent total $As_2O_5$.

| Temperature of precipitation. | Water soluble arsenic acid content, calculated as $As_2O_5$, when made. | Water soluble arsenic acid content, calculated as $As_2O_3$, after 15 months storage. |
|---|---|---|
| 80° F. | .77 per cent. | 2.41 per cent. |
| 90° F. | .78 " | 2.01 " |
| 140° F. | .24 " | .29 " |
| 180° F. | .14 " | .34 " |

The stability of a product containing about 50 per cent total $As_2O_5$ produced by hot precipitation, as compared with a similar product produced by cold precipitation is indicated by the following data.

| Temperature of precipitation. | Water soluble arsenic acid content, calculated as $As_2O_5$, when made. | Water soluble arsenic acid content, calculated as $As_2O_3$, after 15 months storage. |
|---|---|---|
| Atmospheric temperature 180° F. | 2 to 3 per cent. .14 " | 5 to 10 per cent. .93 " |

We claim:

1. Process of making a stable, water-insoluble arsenate of lime product which comprises precipitating calcium arsenate in a medium maintained at a temperature of from 120° F. to 160° F.

2. Process of making calcium arsenate which comprises reacting upon a water soluble compound of arsenic with a water soluble compound of calcium in a reaction mixture maintained at a temperaure of from 120° F. to 160° F.

3. Process of making calcium arsenate which comprises reacting upon calcium hydroxid with a solution of arsenic acid in a reaction mixture maintained at a temperature of from 120° F. to 212° F.

4. Process of making calcium arsenate which comprises reacting upon calcium hydroxid with arsenic acid in a reaction mixture maintained at a temperature of from 140° F. to 160° F.

5. Process of making calcium arsenate which comprises neutralizing a lime slurry with a solution of arsenic acid while maintaining the reaction mixture at a temperature of from 120° F. to 212° F.

6. Process of making a stable arsenate of lime product containing more than 40% arsenic acid calculated as $As_2O_5$ which comprises reacting with arsenic acid solution upon a lime slurry, and maintaining the temperature of the reaction mixture at from 120° F. to 212° F.

7. Process of making calcium arsenate which comprises neutralizing a lime slurry with a solution of arsenic acid while maintaining the reaction mixture at a temperature of from 140° to 160° F.

8. Process of making calcium arsenate which comprises adding a solution of arsenic acid containing about 20% $As_2O_5$ to a lime slurry containing about 10% CaO while maintaining the reaction mixture at a temperature of from 120° F. to 212° F.

9. Process of making calcium arsenate which comprises adding a solution of arsenic acid containing about 20% $As_2O_5$ to a lime slurry containing about 10% CaO while maintaining the reaction mixture at from 140° to 160° F.

10. A stable arsenate of lime product containing at least 40 per cent of $As_2O_5$, said product being stable under storage and containing less soluble arsenic than a product containing the same quantity of $As_2O_5$ produced by the interaction of an arsenic acid solution and a lime slurry at a temperature less than 120° F.

11. Arsenate of lime product containing at least 40 per cent of $As_2O_5$, said product being more stable under storage than arsenate of lime produced by the interaction of arsenic acid solution and lime slurry at ordinary room temperatures.

12. Arsenate of lime such as may be prepared by the hereindescribed process which comprises reacting upon a lime slurry with a solution of arsenic acid while maintaining the reaction mixture at a temperature of from 120° F. to 212° F.

In testimony whereof, we affix our signatures.

LOUIS CHARLES DREFAHL.
CHARLES H. SAKRYD.